US009116243B1

(12) United States Patent
Brown

(10) Patent No.: US 9,116,243 B1
(45) Date of Patent: Aug. 25, 2015

(54) HIGH ALTITUDE ICE PARTICLE DETECTION METHOD AND SYSTEM

(71) Applicant: Robert G. Brown, Tustin, CA (US)

(72) Inventor: Robert G. Brown, Tustin, CA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 71 days.

(21) Appl. No.: 14/033,202

(22) Filed: Sep. 20, 2013

(51) Int. Cl.
G01J 3/44 (2006.01)
G01S 17/95 (2006.01)

(52) U.S. Cl.
CPC ..................... G01S 17/95 (2013.01)

(58) Field of Classification Search
CPC ........... G01N 1/08; G01N 1/10; G01N 15/06; G01N 21/21; G01N 21/538; G01N 2021/4707; G01N 2021/4709; G01N 21/53; B64D 15/20; B64D 15/22; G08B 19/02
USPC .............. 356/335–343, 73, 28, 301; 250/373, 250/374, 376; 340/580, 581, 601, 962; 324/671
See application file for complete search history.

(56) References Cited

U.S. PATENT DOCUMENTS 6,091,335 A * 7/2000 Breda et al. .................... 340/580
8,325,338 B1 * 12/2012 Pope et al. ..................... 356/301
2004/0206854 A1 * 10/2004 Shah et al. ..................... 244/144
2012/0182544 A1 * 7/2012 Asahara et al. ................. 356/73
2014/0330459 A1 * 11/2014 Baumgardner et al. ........ 701/14
2014/0379263 A1 * 12/2014 Ray et al. .......................... 702/3

FOREIGN PATENT DOCUMENTS

EP 1391382 A1 * 2/2004
GB 2511344 A * 9/2014

OTHER PUBLICATIONS

Deirmendjian, Electromagnetic Scattering on Spherical Polydispersions, American Elsevier Publishing Company, 1969, 318 pages.
Kogelnik et al., Laser Beams and Resonators, Proceedings of the IEEE, vol. 54, No. 10, Oct. 1966, 19 pages.
Laser Safety Handbook, Northwestern University—Office for Research Safety, Feb. 2011, 20 pages.

* cited by examiner

Primary Examiner — Hoa Pham
(74) Attorney, Agent, or Firm — Angel N. Gerdzhikov; Donna P. Suchy; Daniel M. Barbieri

(57) ABSTRACT

An optical system for detection of atmospheric ice particles is described. The optical system includes a laser light source configured to emit laser light, a photodetector, a first lens element and detection electronics. The first lens element is arranged to image light from the laser light source onto a measurement volume, and to direct scattered light received from the measurement volume to the photodetector. The detection electronics is connected to the photodetector, and is configured to receive a light detection signal from the photodetector and to indicate whether or not the atmospheric ice particles exist in the measurement volume based on the light detection signal.

18 Claims, 4 Drawing Sheets

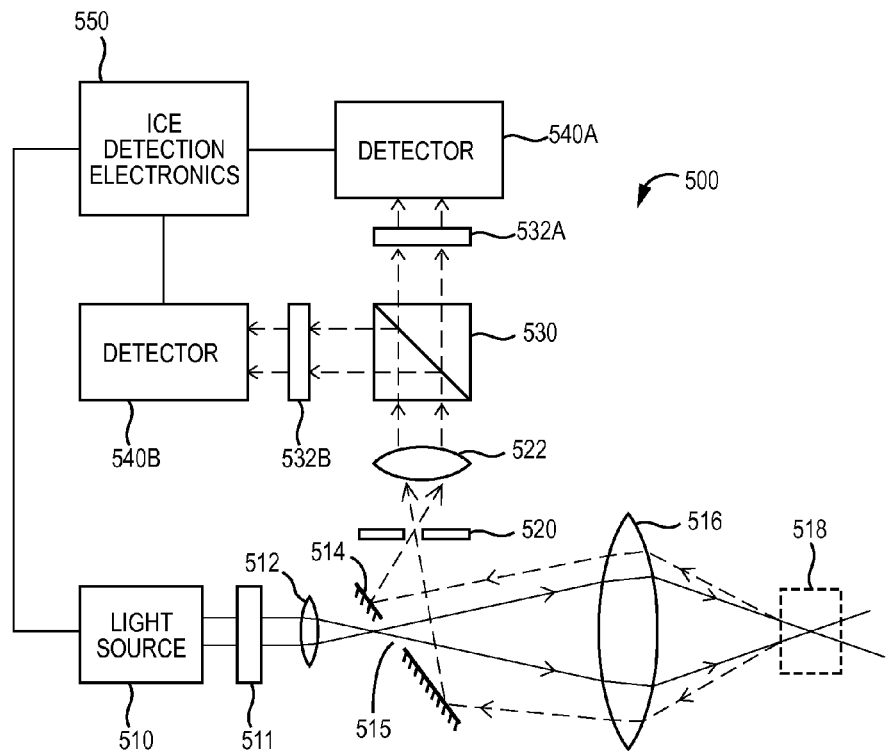
FIG. 5
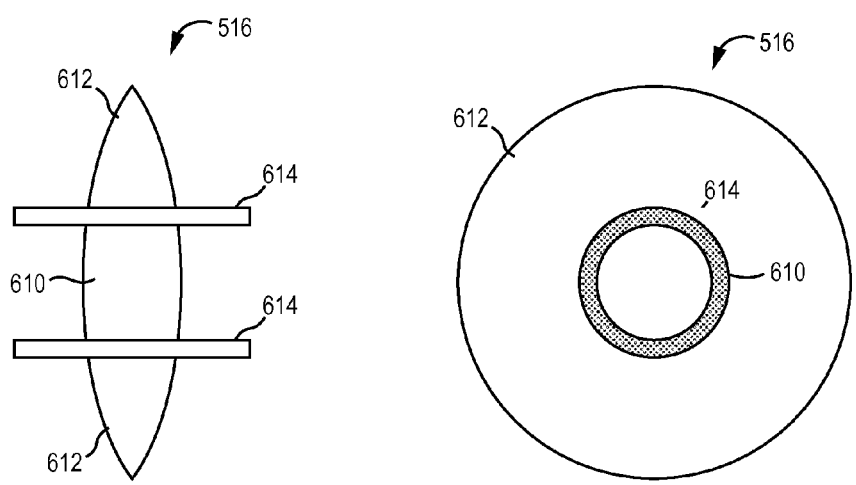
FIG. 6A
FIG. 6B

HIGH ALTITUDE ICE PARTICLE DETECTION METHOD AND SYSTEM

FIELD OF THE INVENTION

The present disclosure relates to an optical system for detection of atmospheric ice-particles.

BACKGROUND

Atmospheric ice-particles may pose a threat for engines of aircraft in flight. Ice-particles may get into aircraft engines and attach themselves to engine surfaces, building up until ice causes engine failure in some way. The ice particles typically are present in the atmosphere in the form of ice-particle aerosols.

Aircraft born radar systems are known for detecting atmospheric phenomena, such as clouds, rainfall, and Clear Air Turbulence (CAT). Ice crystals often exist in optically dense clouds at high-altitude. Radar systems, however, use electromagnetic radiation (EMR) wavelengths of a few meters to a few mm in wavelength, which are much larger than the size of ice-particles in typical atmospheric ice-particle aerosols of ~10 microns to 1000 microns. In this case, ice-particle aerosols comprise particles far too small to provide significant backscatter returns for Radar systems, because the scattering cross sections are very small.

Lidar (light detection and ranging) systems are known to have been used for detecting ice-crystals in clouds. The amplitude of lidar returns from clouds can be large, with potentially high signal-to-noise ratios being possible. Lidar instrumentation, however, is typically physically large (the optics have a characteristic diameter of 30 cm-50 cm), heavy, costly, fragile and power-hungry, and thus is not used for airplane deployment.

SUMMARY OF THE INVENTION

According to one embodiment, there is provided an optical system for detection of atmospheric ice particles, comprising: a laser light source configured to emit laser light; a photodetector; a first lens element arranged to image light from the laser light source onto a measurement volume, and to direct scattered light received from the measurement volume to the photodetector; and detection electronics, connected to the photodetector, and configured to receive a light detection signal from the photodetector and to indicate whether or not the atmospheric ice particles exist in the measurement volume based on the light detection signal.

According to one aspect of the embodiment, the first lens element is less than about 10 cm in diameter.

According to another aspect of the embodiment, the laser light source comprises a pulsed laser configured to be repetitively pulsed at a pulse repetition frequency.

According to another aspect of the embodiment, the pulsed laser is configured to be operated in q-switched or mode-locked mode.

According to another aspect of the embodiment, the pulsed laser is a YAG-based laser, or a $CO_2$ laser.

According to another aspect of the embodiment, first lens element comprises a single lens system.

According to another aspect of the embodiment, the first lens element comprises an annular, core-drilled lens.

According to another aspect of the embodiment, the laser light source is configured to emit laser light which is plane polarized or circularly polarized.

According to another aspect of the embodiment, a spatial filter is arranged to pass the scattered light directed by the first lens element and to reduce background noise light.

According to another aspect of the embodiment, the photodetector comprises a first photodetector and a second photodetector, and further comprises a polarizing beamsplitter arranged to split the scattered light directed by the first lens element into two orthogonal polarization components, and to direct the two orthogonal polarization components to the first photodetector and the second photodetector, respectively.

According to another aspect of the embodiment, the detection electronics is configured to determine the ratio of two orthogonal polarization components and to measure a depolarization coefficient based on the ratio.

According to another aspect of the embodiment, the detection electronics is configured to determine the existence of the ice particles based on the depolarization coefficient.

According to another aspect of the embodiment, the photodetector is configured to detect Raman shifted wavelengths of the scattered light, and the detection electronics is configured to determine the existence of atmospheric ice particles based on the ratio of two Raman shifted wavelengths.

According to another aspect of the embodiment, the photodetector comprises an avalanche photodiode.

According to another aspect of the embodiment, the avalanche photodiode is used in Geiger mode.

According to another aspect of the embodiment, the detection electronics is configured to pulse the photodetector on/off in synchronism with laser pulses from the laser light source being off/on, such that the photodetector is turned off when the laser pulses are inside the optical system or in close vicinity to the optical system.

According to another aspect of the embodiment, the detection electronics is configured to scan the laser light angularly through space and to time gate the photodetector on and off, and to construct a three-dimensional plot including range and spatial location of the ice particles based on the scan and time gating.

According to another aspect of the embodiment, a system comprises a land-based, air-borne or sea-born vehicle, where the optical system is mounted on the vehicle.

According to another aspect of the embodiment, the detection electronics is configured to operate the laser beam power of the laser light to be eye safe to passengers in another vehicle who are at risk of accidentally being irradiated by the laser light, at a range of approximately 9 km.

According to another aspect of the embodiment, a laser frequency shifting element is arranged in a laser beam path of the laser light, wherein the detection electronics is configured to measure the relative frequency shift of the scattered laser light, and to determine the velocities of particles in the measurement volume based on the relative frequency shift.

According to another aspect of the embodiment, the detection electronics is configured to detect and quantify Clear Air Turbulence (CAT) based on the measured relative frequency shift of the scattered laser light.

According to another aspect of the embodiment, the detection electronics is configured detect the existence of ice particles based on two different light scattering techniques simultaneously.

According to another aspect of the embodiment, the two different light scattering techniques include the determination of the existence of atmospheric ice particles based on the ratio of two Raman shifted wavelengths, and the determination of the existence of atmospheric ice particles based on based on a depolarization coefficient of two polarization components of backscattered light.

According to another embodiment, there is provided a system for detection of atmospheric ice particles based on Fraunhofer forward light scattering, comprising: an engine of an air-borne vehicle; a laser light source configured to emit laser light into a region of an air intake of the engine as a measurement volume; a photodetector arranged to receive forward scattered light from the measurement volume; and detection electronics, connected to the photodetector, and configured to receive a light detection signal from the photodetector and to indicate whether or not the atmospheric ice particles exist in the measurement volume based on the light detection signal.

According to yet another embodiment, there is provided a method for detection of atmospheric ice particles, comprising: imaging laser light onto a measurement volume; directing scattered light received from the measurement volume to a photodetector; and indicating whether or not the atmospheric ice particles exist in the measurement volume based on a light detection signal from the photodetector.

BRIEF DESCRIPTION OF THE DRAWINGS

FIG. 5 is a schematic illustrating an optical system according to an embodiment of the invention.

FIG. 6A illustrates a side view of an annular core drilled lens used in the optical system according to an embodiment of the invention.

FIG. 6B illustrates a front view of the annular core drilled lens of FIG. 6A.

DETAILED DESCRIPTION OF THE INVENTION

Ice particles

The sizes of ice-crystals in clouds varies as the shapes vary, where a prevalent ice-crystal shape has a hexagonal cross section and is of a columnar/cylindrical structure. Predominant dimensions of ice-crystals are found to be in the few to 100s of microns. D. Deirmendjian, [Electromagnetic Scattering on Spherical Polydispersions, Elsevier (1969)] provides a model for the shape of the ice-crystal size number distributions and addresses the polydisperse size distributions associated with both water and ice-crystal clouds. In particular, Deirmendjian provides ice-crystal clouds modeled as cloud type C1, where the C1 size distribution is shown in FIG. 1.

The particle number distribution for the C1 model is: $n(r)=a\,r^\alpha \exp(-b\,r^\gamma)$, where r is the particle radius, a=2.373, $\alpha$=6, $\gamma$=1 and b=3/2. Additional parameters include N=100 $cm^{-3}$, $r_c$=4 microns, $n(r_c)$=24.09 $cm^{-3}\mu^{-1}$ and $V_p$=6.255*$10^{-8}$, where N is the total number of particles per unit volume, $r_c$ is the mode radius or maximum frequency in the distribution, $n(r_c)$ is the value of n at the mode radius value, and $V_p$ is the total volume occupied by the particles per unit volume of space.

The vast majority of the ice-particles are in the form of the smallest particles. If $f_N(r)$ is the particle number distribution, then the associated particle mass distribution is given by: $f_M(r)=k_M \rho_p\, r^3\, f_N(r)$, where $k_M=(\alpha_V \rho_p/V)$; and $\alpha_V$ relates the particle's volume to its linear dimension, $\rho_p$ is the particle's density, which for ice is ~0.92 grams/cc.

Figure 1:
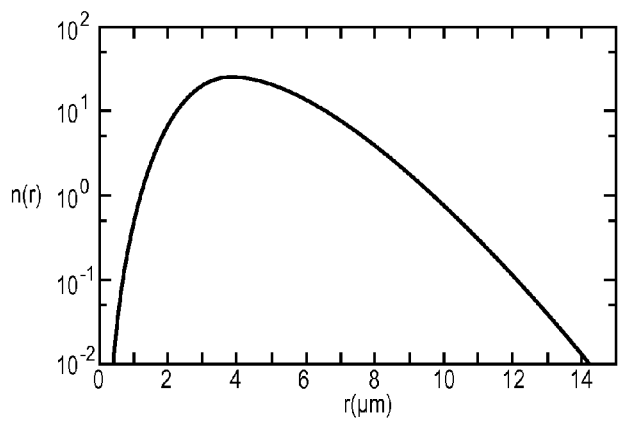
FIG. 1 is a graph showing the size distribution of ice-crystals in a type C1 cloud.
Figure 2:
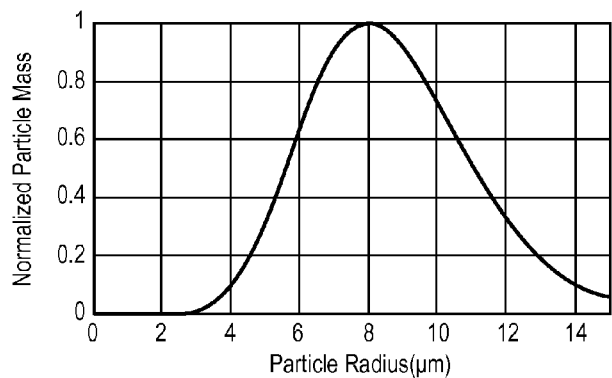
FIG. 2 is a graph showing the mass distribution of ice-crystals in a type C1 cloud.

FIG. 2 illustrates the mass distribution corresponding to the C1 model particle radius distribution of FIG. 1. As can be seen in FIG. 2, the majority of the mass of ice-particles in the cloud aerosol lies in particles of radius less than 15 microns and greater than 3 microns. Thus, for ice particle detection, particles in the range of 3 to 15 microns need to be detected by the detection scheme.

Raman Scattering Detection

Figure 3:
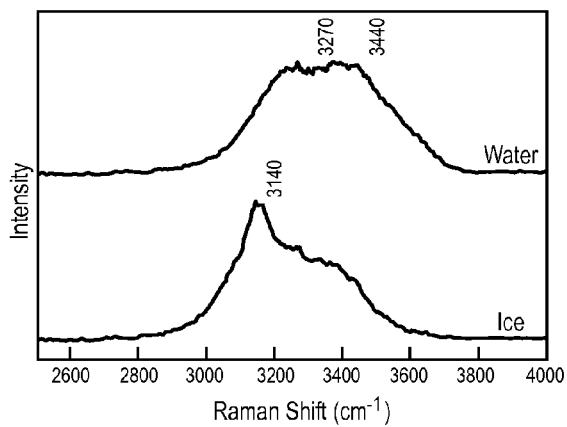
FIG. 3 is a graph showing the Raman spectra for ice and water.

Detection of ice-particles using Raman scattering allows for discriminating ice from water, by ratios of Raman scattering strength at two different wavelengths, because the Raman spectrum for ice and water are different. The Raman spectra for ice and water are shown in FIG. 3. For example, in FIG. 3, ice has a peak at 3140 $cm^1$, which corresponds to a wavelength of 3.185 microns.

As can be seen, the ratio of the Raman strengths for ice at 3140 $cm^{-1}$ and ~3550 $cm^{-1}$ are around 10:1, while the ratio of the Raman strengths for water at 3140 $cm^{-1}$ and ~3550 $cm^{-1}$ is about 1:1. Therefore the existence of ice may be discriminated from the existence of water based on the ratio of the Raman strengths at two wavelengths, for example 3140 $cm^{-1}$ and ~3550 $cm^{-1}$, where a ratio greater than about 1:1 (for wavelengths 3140 $cm^{-1}$ and ~3550 $cm^{-1}$) indicate the existence of ice. In this way the existence of atmospheric ice particles may be based on the ratio of two Raman shifted wavelengths. Width bandpass optical filters or a diffraction grating may be used to separate the wavelengths for detection.

Unshifted Backscattered Light Scattering Detection and Depolarization Ratio

Particles much smaller than the wavelength of light incident upon them scatter light fairly uniformly in all directions, which is known as Rayleigh scattering. Larger particles of significantly different refractive index to their host medium have a complicated lobed structure of scattering with scattering angle, known as Mie scattering. For particles sizes in the range of the C1 model, and for light wavelengths in the visible and near IR, Mie scattering is appropriate. Furthermore, it may be assumed that the particles are non-absorbing, which is appropriate for ice particles.

In the standard notation of Mie scattering, the Mie scattering coefficients $i_1$ and $i_2$, pertain to the vertical and horizontal polarization scattering coefficients of a single scattering particle illuminated by coherent and vertically polarized light. The intensity, I, of scattered light at a particular scattering angle is directly proportional to $i_1$ and $i_2$, through the equation:

$$I=Io(i_1+i_2)/2k^2r^2,$$

where Io is the incident light intensity, r is the distance from the center of the sphere and k=$2\pi/\lambda$, where $\lambda$ is the wavelength of the incident light. The equations for $i_1$ and $i_2$ both contain complicated expressions in terms of the scattering angle. The degree of polarization of the scattered light is given by $(i_1-i_2)/i_1+i_2)$, and the depolarization ratio is given by $(i_1)/(i_2)$.

The scattering strength in the near IR may be compared to that for Radar wavelengths. A laser beam of 1 micron wavelength scattering off an ice-crystal of 3 microns radius, for example, may be compared to the scattering strength at a radar wavelength of 1 mm, looking across the entire 180 degrees from forward scatter to backscatter. This comparison is illustrated in FIG. 4A (1 micron wavelength light) and FIG. 4B (1 mm wavelength radar), just for log($i_s$).

Figure 4A:
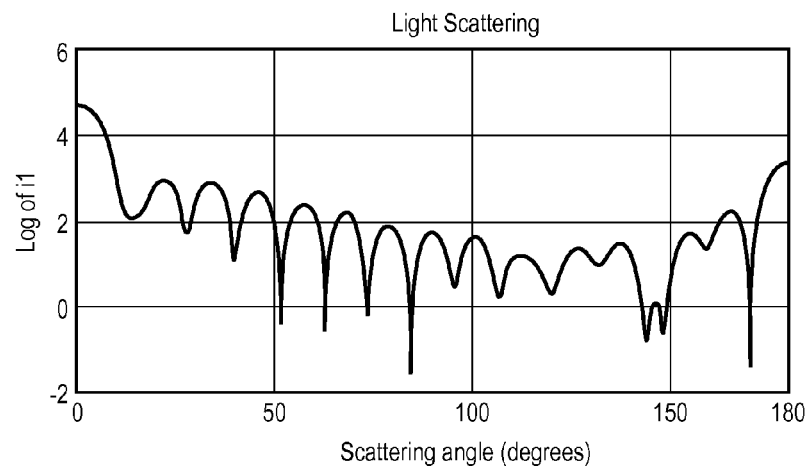
FIG. 4A is a graph showing the light scattering strength of light off a 3 micron radius ice-crystal as a function of scattering angle for 1 micron wavelength radiation.
Figure 4B:
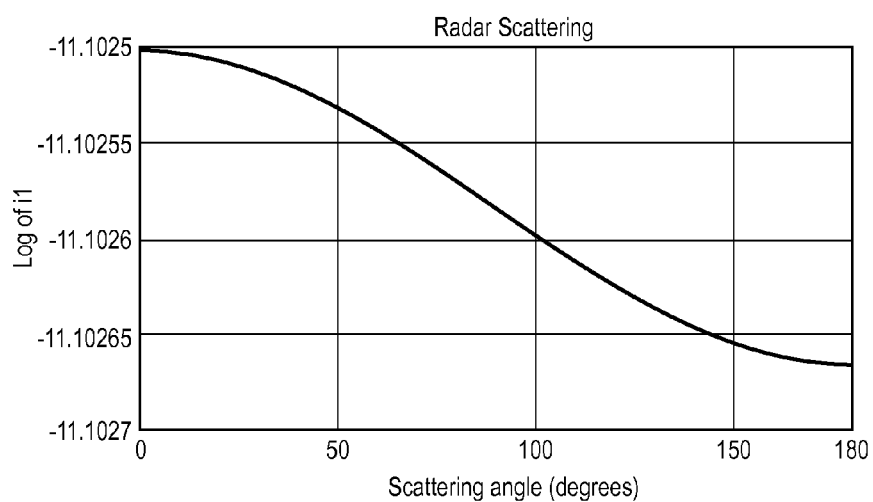
FIG. 4B is a graph showing the light scattering strength of light off a 3 micron radius ice crystal as a function of scattering angle for 1 mm wavelength radiation.

The micron wavelength light in FIG. 4A illustrates a truly 'lobed' scattering strength for illumination of the 3 micron radius particle, as is typical for Mie scattering, while FIG. 4B illustrates, using 1 mm radar illumination, an almost constant intensity as a function of scattering angle, which is expected for Rayleigh scattering.

At the backscattering angle of 180 degrees for 1 micron wavelength laser light, the scattering strength shows a log (strength) of 3.4, while the comparable log(strength) at 180 degrees in FIG. 4B for the 1 mm wavelength radar illumination is −11.1. Significantly, there are ~14 orders of magnitude difference between the near IR 1 micron illumination and the 1 mm radar illumination of a 3 micron radius ice-particle. For longer radar wavelengths than 1 mm, and thus lower frequencies, the orders of magnitude difference is even greater.

The volume scattering cross section for polydisperse ice-particle aerosols may be calculated as follows. The scattering cross-section per unit volume of space containing N particles of relative size $x=2\pi r/\lambda$ is: $\beta_{sc}=N \pi r^2 K_{sc}(x)$, where $K_{sc}(x)$ is the Mie scattering-coefficient $i_s(x)$ for plane-polarized light.

The particle distribution function n(r) may be defined in terms of the Mie scatter parameter $x=kr=2\pi r/\lambda$; and the volume scattering cross section may be written as:

$$\beta_{sc}(\lambda, n(x)) = \pi k^{-3} \int x^2 n(x) K_{sc}(x) dx,$$

where the integral is from zero to infinity.

This scattering cross-section, $\beta_{sc}$, may be used to calculate the signal return from light backscattered for an ice-particle distribution in a C1 cloud.

Optical System

FIG. 5 is a schematic illustrating an optical system 500 according to an embodiment. The optical system 500 includes a laser light source 510 configured to emit laser light, a first lens element 516, and a photodector 540 which may comprise photodetetectors 540A and 540B, and detection electronics 550.

The laser light source 510, may be a pulsed laser which may be repetitively pulsed at a pulse repetition frequency, or may be a mode-locked laser. The pulsed laser may a YAG-based laser, such as a Nd:YAG, an Alexandrite laser, or a $CO_2$ laser, for example. A pulsed laser may provide for range gating and range resolution which helps in rejecting close up backscatter from the air just in front of an aircraft, in the case the that optical system 500 is mounted on an aircraft. Q-switching of the laser light source 510 may create giant pulses of energy in very short pulses, which may further provide restriction of the observed range, as well as high instantaneous signal-to-noise ratios.

The laser light source 510 may emit pulsed plane polarized light, such as vertical or horizontal polarized, or circularly polarized light, to interrogate both the vertical and horizontal scattering components simultaneously.

The photodetector 540 may be a single detector, or may be two detectors 540A and 540B. Two detectors could be used, for example, for depolarization measurements. The photodetector 540 may be, for example, an Avalanche Photo-Diode (APD), or a nano-plasmonic detector, which provides for even higher responsivity. Light recirculating optics may be provided in front of the detectors to enhance responsivity, if required, allowing multiple bounces of the light off the photodetector 540 to increase the chance of its absorption and detection.

The laser light source 510 may be arranged to direct light to a first lens element 516, which images the light onto a measurement volume 518. In this regard, laser light source 510 may be arranged such that light emitted from the laser light source 510 is converged by a lens 512 to an aperture 515 in a mirror 516 and imaged by the first lens element 516 onto the measurement volume 518.

The first lens element 516 may be an annular core drilled lens so as to separate light transmitted from the laser light source 510 from the backscattered light received from the measurement volume, particularly in the case where depolarization detection techniques are used and the polarized and depolarized light scattering returns are received from a cloud to be interrogated. Such an annular core drilled lens may aid in separating a return of the same polarization as the light emitted from the laser light source.

Figure 7:
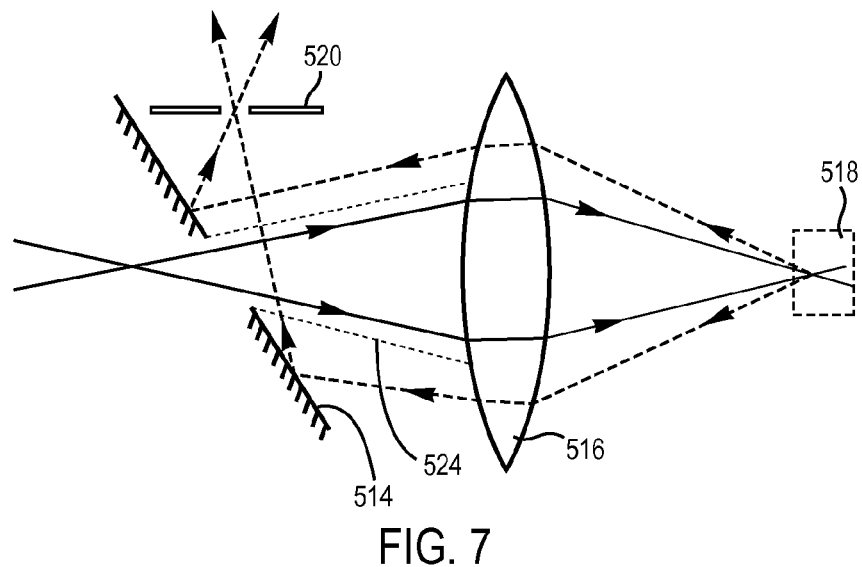
FIG. 7 is a schematic of a portion of the optical system of FIG. 5 illustrating the first lens element and a spatial filter.

As seen in FIGS. 5 and 7, the laser light emitted from the laser light source traces a path through the central portion of the first lens element 516, while the return light is collected in an annulus of the first lens element 516 surrounding central portion. FIGS. 6A and 6B illustrate a side and front view, respectively, of the first lens element 516 in the form of an annular core drilled lens. The first lens element 516 has a central portion 610 with annular region 612 surrounding the central portion 610, with ring 614 separating the central portion 610 from the annular region 612. The ring 614 extends sufficiently to block light reflected from the central portion 610. The first lens element 516 may be less than about 10 cm in diameter, thus providing relatively small optics, and its attendant small optical system size and weight.

As can be seen in FIGS. 5 and 7, the backscattered light collected by the first lens element 516 is directed onto the mirror 514, which directs the light through a spatial filter 520 and to the detector 540. The spatial filter 520 is arranged to pass the scattered light directed by the first lens element 516 and to reduce background noise light.

Figure 9:
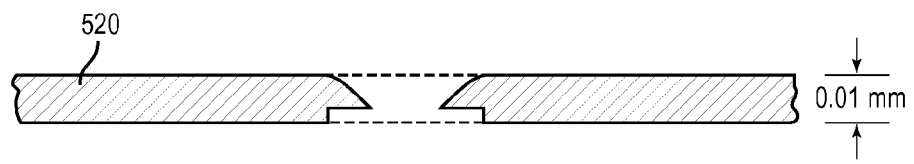
FIG. 9 is a side cross sectional view of a spatial filter used in the optical system of FIG. 5.

FIG. 9 is a cross-section of an appropriate spatial filter 520. The thickness of the spatial filter 520 is preferably sufficiently small so as not to vignette some of the received backscattered light.

Figure 8:
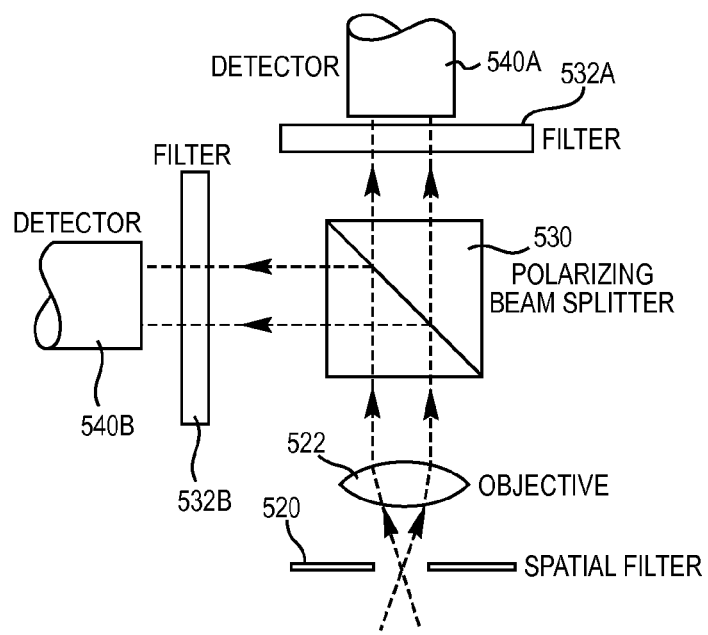
FIG. 8 is a schematic of a portion of the optical system of FIG. 5 illustrating the detectors and polarizing beamsplitter.

As shown in FIG. 5 and FIG. 8, the optical system 500, particularly in the case of depolarization detection, includes a polarizing beam splitter 530 arranged to split the scattered light directed by the first lens element 516 and passing through the spatial filter into two orthogonal polarization components, and to direct the two orthogonal polarization components to the first photodetector 540A and the second photodetector 540B, respectively. As seen in FIG. 8, the first photodetector 540A and the second photodetector 540B respectively have filters 532A and 532B arranged to pass light from the polarizing beam splitter 530 to the detectors. The filters 532A and 532B may be bandpass filters, for example, to reduce undesired light from impinging on the photodetectors 540A and photodetector 540B.

As shown in FIG. 5, the detection electronics 550 is connected to the photodetector 540 and may be connected to the laser light source 510. The detection electronics 550 is configured to receive a light detection signal from the photodetector 540 and to indicate whether or not the atmospheric ice particles exist in the measurement volume 518 based on the light detection signal. In this regard the detection electronics 550 may include a processor and associated software to perform signal analysis and control of the detector 540 and light source 510.

The detection electronics 550 is configured to indicate whether or not the atmospheric ice particles exist in the measurement volume 518 based upon one or more detection techniques. For example, if the detection technique is based on the depolarization coefficient of the backscattered light, the detection electronics 550 is configured to determine a ratio of two orthogonal polarization components of the backscattered light, to measure a depolarization coefficient based on the ratio, and to determine the existence of the ice particles based on the depolarization coefficient. As another example, if the detection technique is based on Raman shifted light, detection electronics 550 is configured to determine the existence of atmospheric ice-particles based on the ratio of two Raman shifted wavelengths detected by the photodetector 540.

The existence of atmospheric ice-particles may be determined based on more than one detection technique in concert. For example, the detection technique may be based on the depolarization coefficient of the backscattered light, and on Raman shifted light together. The confidence factor of predicting the existence of ice particles is enhanced by having two different techniques separately predict the existence of ice-particles.

The optical system 500 may be mounted on different type of vehicles, in addition to an aircraft (air-born vehicle). For example, the system 500 may be mounted on a land based or a sea-born vehicle.

The detection electronics 550 may be configured to scan the laser light angularly through space and to time gate the photodetector 540 on and off. In the instance that time gating is employed, the first lens unit 516 need not be a core drilled lens. The detection electronics 550 may further be configured to construct a three-dimensional plot including range and spatial location of the ice-particles based on the scan and time gating. The detection electronics 550 may control the laser light source 510 so that laser beam from the light source 510 is x-y-scanned and range gated.

The optical system 500 may include a laser frequency shifting element 511 arranged in a laser beam path of the laser light to frequency shift the beam emitted from the laser light source 510. In this case, the detection electronics 550 may be configured to measure the relative frequency shift of the scattered laser light, and to determine the velocities of particles in the measurement volume 518 based on the relative frequency shift. In this case velocity distributions associated with CAT may be determined. The frequency shifting element 511 may be an acousto-optic device such as a Bragg cell, a surface acoustic wave (SAW) device, or a MEMs device, for example.

While FIG. 5 illustrates an optical system for a backscattering arrangement, alternatively, the optical system may be arranged for detection of forward scattering. In this case the first lens unit 516 may include different lenses for imaging onto the measurement volume, and collecting light scattered by the measurement volume, where the collected scattered light is directed to the photodetector 540. As an example, such a forward scattering optical system may be employed for detecting ice at the air intake of an engine, where laser light source 510 is mounted on one side of the intake and the light detector 540 on an opposite side of the intake.

Range for Ice-Particle Detection

The signal strength and range for ice-particle detection using the optical system mounted on an aircraft for detecting ice-particles in a high altitude cloud may be estimated as in the following description.

In this estimation, the photodetector is taken to be an avalanche photodiode (APD). Commercial APDs may have a responsivity of ~35 Amps/Watt and a quantum efficiency of >50%. For parameters for the laser light source, a pulse-length of ~25*10$^{-9}$ seconds (implying a measurement-volume length of 7.5 meters) is presumed.

The governing equation for signal strength versus maximum range to the target position is well known in the radar and lidar literature as follows:

$$R\text{max} := \left[\frac{TRANS \cdot Pt \cdot G \cdot Ae \cdot \sigma}{(4 \cdot \pi)^2 \cdot S\text{min}}\right]^{\frac{1}{4}},$$

where Rmax is the maximum radar range, Pt is the transmitted power in Watts, G is the antenna (or detector) gain, Ae is the effective receiver aperture area, σ is the radar target scattering (or reflection) cross section, TRANS is the transmissivity of the optics and atmosphere, and Smin is the minimum detectable signal in Watts.

The assumed parameters for the collecting lens of the optical system are as follows. The collecting lens for the optical system is assumed to have a value of 10 cm, and to be core drilled. A beam of 2.3 cm diameter is transmitted through the center of the lens, which, by virtue of the Dickson criteria for negligible truncated beam diffraction, means that the core drilled region must be 1.7× the beam diameter, thus 4 cm in diameter.

The diameter of the laser beam will increase as the beam propagates through the atmosphere to the high altitude cloud. Based on Kogelnik and Li's famous TEM$_{00}$ laser beam equations [H. Kogelnik and T. Li, '*Laser beams and resonators*', Proc. IEEE, 54, p. 1312, (1966)], the beam diameter is calculated to be 0.531 m diameter at 9 km range, and 0.95 m in diameter at 16 km.

The parameters for the equation for signal strength versus maximum range above are taken as follows.

Pt—an off-the-shelf Nd:YAG 1064 nm q-switched laser may have an output power of 100 mJ (limited for the sake of eye-safety). The laser pulse is 25 ns wide and the pulse-repetition rate is typically 10 pulses per second.

G—the gain of an APD operated in Geiger mode can be as high as $10^8$, and a conservative value of $5*10^7$ is taken to provide a margin of comfort. Quantum efficiency is around 50% when optimized for 1064 nm detection.

Ae—the collection area of the 10 cm diameter lens is ($\pi*$(diameter)$^2$)/4.

σ—the scattering cross-section is the volume scattering cross section $\beta_{sc}$ such as calculated for FIG. 4B for the ice-particle aerosol, multiplied by the measurement volume in cubic meters, calculated from its 25 ns pathlength times the laser beam diameter at the range being calculated.

TRANS—the combined transmission of the optics and the atmosphere. For the optics, a conservative estimate of transmission is 10%. The clear atmosphere exhibits an attenuation coefficient of ~0.114 km$^{-1}$ at a laser wavelength of 1064 nm. The transmission over 16 km is therefore exp(−0.114*16)=0.161, or 16%. Overall system transmission is therefore estimated to be about 1.6%.

Smin—the minimum detectable power is a single photon for a Geiger mode APD, and 5 photons is conservatively selected as a minimum signal return strength during a 25 ns observation window. As well known from photon counting studies of APDs on this timescale, the arrival of two or more photons and their detection will cause pulse pile up and instantaneous quasi-analog signal output, not discretely resolvable photo detection events. The noise pulses in that very short time from a cooled detector will be virtually zero, rarely if ever more than 1 noise photoelectron pulse. At 1064 nm there are $5.35*10^{18}$ photons per Watt, and 5 photons corresponds to a minimum detectable number of $0.9*10^{-18}$ Watts.

Based on the above assumed parameters, the maximum range to detect the ice-particles of cloud C1 type is estimated to be Rmax=16.5 km. Thus, for an optical system mounted on an aircraft with Rmax=16.5 km, where the aircraft travels at 600 miles per hour, a pilot would have ~1 minute of warning of a potential ice cloud ahead of his airplane.

Laser Eye Safety

There is a vanishingly small but finite chance that an invisible, 1064 nm ice detection laser pulse could strike another aircraft at distance, enter a window and then enter a passenger's eye. Below is estimated the distance for the above system to be safe to look at. Assuming the closest that two airplanes should be apart at the same altitude is the conflict range. A conflict is an event in which two or more aircraft experience a loss of minimum separation. A conflict occurs when the distance between aircraft in flight violate a defining criterion, usually considered as 5 nautical miles (9 km) of horizontal and/or 1000 feet of vertical separation At a distance of 9 km, the laser beam will have grown in size from 2.3 cm diameter initially, to 0.53 m. Under that condition, and that of the minimum atmospheric attenuation coefficient $0.114$ $km^{-1}$, the energy-density of a laser pulse is calculated to be $5*10^{-6}$ J $cm^{-2}$. This is the Maximum Permissible Exposure (MPE) level for a 25 ns pulsed 1064 nm laser.

This value is exactly the maximum value of energy density allowed under Laser Safety Regulations [Laser Safety Handbook, Northwestern University. February 2011.], which has a large safety margin in the recommendation. In practice the laser power at minimum airplane separation condition of 9 km is even safer because the above calculation neglects the extra safety margin that the airplane window losses provide.

In sum, an ice-particle detection system as discussed above, operating out to a detection range of 16 km, will be safe to use with other aircraft flying correctly at ranges of 9 km or more.

The embodiments of the invention have been described in detail with particular reference to preferred embodiments thereof, but it will be understood by those skilled in the art that variations and modifications can be effected within the spirit and scope of the invention.

What is claimed is:

1. An optical system for detection of atmospheric ice particles, comprising:
    a laser light source configured to emit laser light;
    a photodetector;
    a first lens element arranged to image light from the laser light source onto a measurement volume, and to direct scattered light received from the measurement volume to the photodetector; and
    detection electronics, connected to the photodetector, and configured to receive a light detection signal from the photodetector and to indicate whether or not the atmospheric ice particles exist in the measurement volume based on the light detection signal,
    wherein the detection electronics is configured to detect the existence of ice particles based on the ratio of two Raman shifted wavelengths, and based on a depolarization coefficient of two orthogonal polarization components of backscattered light which is unshifted in wavelength.

2. The optical system of claim 1, wherein the first lens element is less than about 10 cm in diameter.

3. The optical system of claim 1, wherein the laser light source comprises a pulsed laser configured to be repetitively pulsed at a pulse repetition frequency.

4. The optical system of claim 3, wherein the pulsed laser is configured to be operated in q-switched or mode-locked mode.

5. The optical system of claim 3, wherein the pulsed laser is a YAG-based laser, or a $CO_2$ laser.

6. The optical system of claim 1, wherein first lens element comprises a single lens system.

7. The optical system of claim 6, wherein the first lens element comprises an annular, core-drilled lens.

8. The optical system of claim 1, wherein the laser light source is configured to emit laser light which is plane polarized or circularly polarized.

9. The optical system of claim 1, further comprising a spatial filter arranged to pass the scattered light directed by the first lens element and to reduce background noise light.

10. The optical system of claim 1, wherein the photodetector comprises a first photodetector and a second photodetector, and further comprising
    a polarizing beamsplitter arranged to split the scattered light directed by the first lens element into the two orthogonal polarization components, and to direct the two orthogonal polarization components to the first photodetector and the second photodetector, respectively.

11. The optical system of claim 1, wherein the photodetector comprises an avalanche photodiode.

12. The optical system of claim 11, wherein the avalanche photodiode is used in Geiger mode.

13. The optical system of claim 1, wherein the detection electronics is configured to pulse the photodetector on/off in synchronism with laser pulses from the laser light source being off/on, such that the photodetector is turned off when the laser pulses are inside the optical system or in close vicinity to the optical system.

14. The optical system of claim 1, wherein the detection electronics is configured to scan the laser light angularly through space and to time gate the photodetector on and off, and to construct a three-dimensional plot including range and spatial location of the ice particles based on the scan and time gating.

15. A system comprising a land-based, air-borne or sea-born vehicle, where the optical system of claim 1 is mounted on the vehicle.

16. The system of claim 15, wherein the detection electronics is configured to operate the laser beam power of the laser light to be eye safe to passengers in another vehicle who are at risk of accidentally being irradiated by the laser light, at a range of approximately 9 km.

17. An optical system for detection of atmospheric ice particles, comprising:
    a laser light source configured to emit laser light;
    a photodetector;
    a first lens element arranged to image light from the laser light source onto a measurement volume, and to direct scattered light received from the measurement volume to the photodetector;
    detection electronics, connected to the photodetector, and configured to receive a light detection signal from the photodetector and to indicate whether or not the atmospheric ice particles exist in the measurement volume based on the light detection signal; and
    a laser frequency shifting element arranged in a laser beam path of the laser light, wherein the detection electronics is configured to measure the relative frequency shift of the scattered laser light, and to determine the velocities of particles in the measurement volume based on the relative frequency shift, wherein the detection electronics is configured to detect and quantify Clear Air Turbulence (CAT) based on the measured relative frequency shift of the scattered laser light.

18. A method for detection of atmospheric ice particles, comprising:

- imaging laser light onto a measurement volume;
- directing scattered light received from the measurement volume to a photodetector; and
- indicating whether or not the atmospheric ice particles exist in the measurement volume based on a light detection signal from the photodetector, which is based on the ratio of two Raman shifted wavelengths, and based on a depolarization coefficient of two orthogonal polarization components of backscattered light which is unshifted in wavelength.

* * * * *